Figure 1:
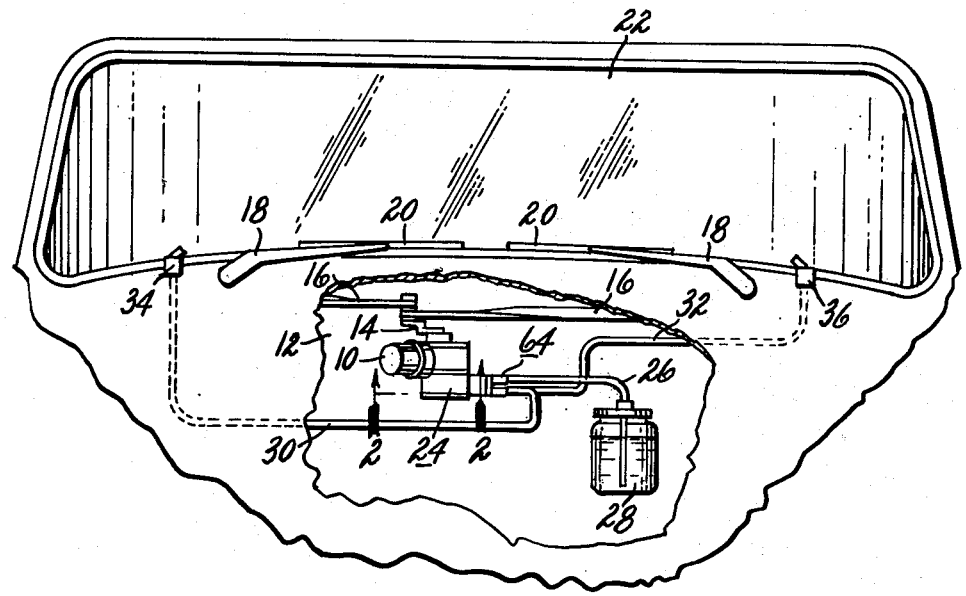

Dec. 24, 1963     E. R. ZIEGLER     3,115,095
WINDSHIELD CLEANING SYSTEM

Filed April 4, 1962     2 Sheets-Sheet 1

INVENTOR.
EUGENE R. ZIEGLER
BY
HIS ATTORNEY

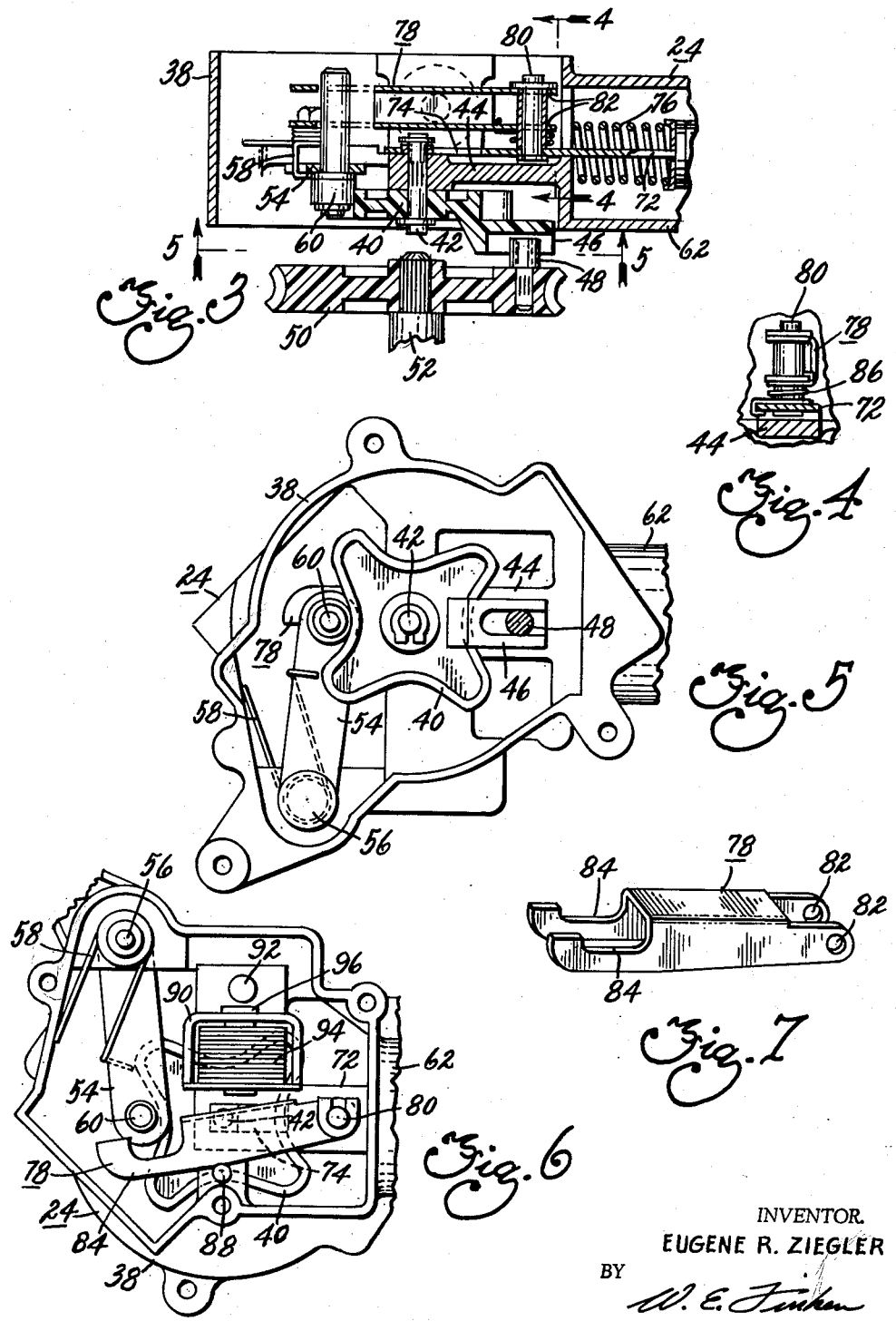

United States Patent Office 3,115,095
Patented Dec. 24, 1963

3,115,095
WINDSHIELD CLEANING SYSTEM
Eugene R. Ziegler, Spencerport, N.Y., assignor to General Motors Corporation, Detroit, Mich., a corporation of Delaware
Filed Apr. 4, 1962, Ser. No. 185,147
5 Claims. (Cl. 103—23)

This invention pertains to windshield cleaning systems, and particularly to an improved system for spraying liquid solvent onto a windshield into the path of movement of the wiper blades thereacross at the demand of the vehicle operator.

In my Patent 2,905,962, a windshield cleaning system is disclosed including a washer pump having an interruptible driving connection with a wiper motor in combination with timing means which, upon manual activation, establishes the driving connection between the washer pump and the wiper motor for a predetermined number of wiping strokes and thereafter automatically arrests operation of the washer pump. In my Patent 2,979,751, a somewhat similar windshield cleaning system is disclosed, but wherein the duration of washer pump operation is determined by the vehicle operator. The present invention relates to a windshield cleaning system of the later type, including a washer pump controlled by operator demand, which is more readily adapted for interchangeable use with the wiper control and actuating mechanism shown in my earlier aforementioned Patent 2,905,962.

Accordingly, among my objects are the provision of an improved manually controlled washer pump capable of being driven by a wiper motor, or other rotary means; the further provision of a manually controlled intermittent squirt type washer pump operated by a wiper motor in timed relation with the stroking movement of the wiper blades; and the still further provision of a manually controlled windshield cleaning system including a washer pump having an electromagnetically controlled interruptible driving connection with the wiper motor.

The aforementioned and other objects are accomplished in the present invention by pivotally mounting the armature of an electromagnet on the reciprocable pump rod, or plunger, the armature having an elongate open slot adapted to drivingly engage a cam follower when the electromagnet is energized. Specifically, the improved windshield cleaning system, as disclosed, comprises a wiper unit having an electric motor connected through a suitable gear reduction to a rotary crank, the rotary crank being connected through linkage means to a pair of spaced oscillatable wiper arm and blade assemblies. The output gear of the gear reduction of the wiper motor drives a multiple lobe cam constituting a part of the washer unit. The washer unit includes a bellows type pump having a spring effected delivery stroke and an intake stroke effected through a plunger. The multiple lobe cam has continuous engagement with a pivotally mounted cam follower having a pin adapted to engage an elongate open slot of the electromagnet armature. The electromagnet armature is pivoted on the pump plunger, and is normally spring biased against a stop, in which position the cam follower pin is disengaged from the slot thereof. When the electromagnet is energized, the armature moves to a position wherein the pin engages the elongate driving slot therein so as to establish the driving connection between the wiper motor and the washer pump, which driving connection will be maintained as long as the wiper motor and the electromagnet are energized.

Further objects and advantages of the present invention will be apparent from the following description, reference being had to the accompanying drawings, wherein a preferred embodiment of the present invention is clearly shown.

Figure 2:
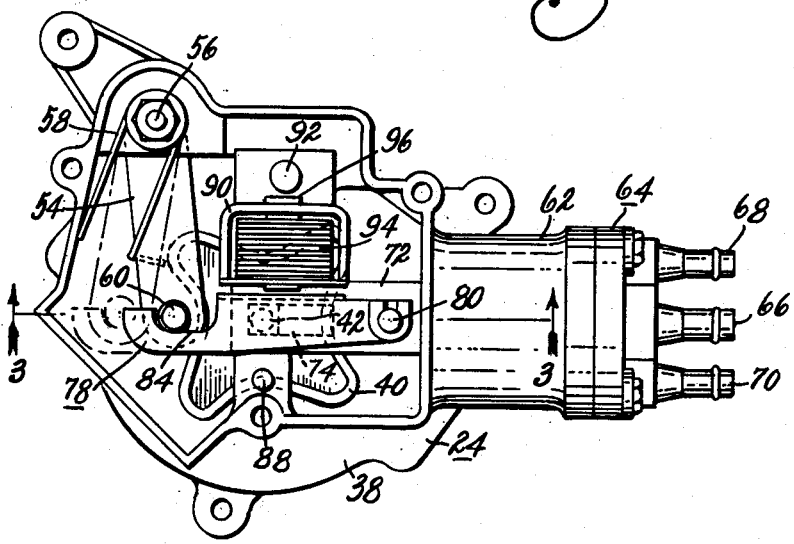

In the drawings:
FIGURE 1 is a fragmentary view, with certain parts broken away, of a motor vehicle equipped with the windshield cleaning system of this invention.
FIGURE 2 is an enlarged plan view in elevation of the washer unit with the bottom cover removed and with the driving connection established.
FIGURE 3 is a fragmentary, sectional view taken along line 3—3 of FIGURE 2.
FIGURES 4 and 5 are fragmentary, sectional views taken along lines 4—4 and 5—5, respectively of FIGURE 3.
FIGURE 6 is a fragmentary view, similar to FIGURE 2, with the driving connection interrupted.
FIGURE 7 is a perspective view of the electromagnet armature.

With reference to FIGURE 1, the improved windshield cleaning system includes a wiper unit comprising a unidirectional direct current motor 10 suitably attached to a vehicle firewall 12 and connected through a worm and worm gear reduction to a rotary shaft having a crank arm 14. The inner ends of the drive links 16 are connected to the crank arm 14, the outer ends of the drive links 16 being drivingly connected to a pair of spaced oscillatable pivot shafts to which wiper arms 18 are connected. The wiper arms carry wiper blades 20 which are oscillatable in phase opposition across the outer surface of the vehicle windshield 22.

The windshield cleaning system includes a washer unit comprising a washer pump 24 attached to the gear reduction housing of the motor 10. The washer pump 24 is connected by conduit 26 to a solvent reservoir 28 through which liquid solvent is supplied to the pump for delivery under pressure to conduits 30 and 32. The conduits 30 and 32 are connected with spaced nozzles 34 and 36, respectively, for spraying liquid solvent onto predesignated areas of the windshield 22 into the paths of movement of the blades 20.

The control system for the wiper unit and the washer unit may include an instrument panel mounted control switch assembly of the type shown in my aforementioned Patent 2,905,962 whereby the wiper unit can be operated independently of the washer unit, but operation of the washer unit automatically initiates conjoint operation of the wiper unit. However, in the instant windshield cleaning system, the duration of washer unit operation is manually determined in addition to operation of the wiper unit being manually determined. Thus, the washer unit may be described as being of the demand "type."

With reference to FIGURES 2 through 6, the washer pump 24 comprises a housing 38 which is bolted to the gear reduction housing of the motor 10. A multiple lobe cam 40 is journalled on a stationary stub shaft 42 which is press fitted in a web 44 of the housing 38. As seen particularly in FIGURES 3 and 5, the cam 40, which is preferably formed of a suitable self-lubricating plastic, such as nylon, has an integral offset slotted crank arm 46 for receiving an upstanding pin 48 carried by a worm wheel 50 constituting the output member of the gear reduction. The crank 14 of the wiper unit is directly attached to the shaft 52 to which the worm wheel 50 is drivingly connected, and thus the washer pump operating cam 40 is driven in unison with the rotary crank 14 of the wiper unit.

A lever 54 is pivotally mounted in the housing 38 on a pin 56, the lever being biased by a hairpin spring 58, the medial portion of which encircles the pin 56 so that a cam follower pin 60 on the outer end of the lever 54 is maintained in continuous engagement with the multiple lobe cam 40. Thus, the pin 60 which, as seen in FIGURE 3, projects from both sides of the oscillatable lever and constitutes a cam follower. Moreover, since the cam 40 is shown having four lobes, it will be appreciated that the lever 54 is oscillated throughout four strokes during each revolution of the cam 40, and hence during each revolution of the shaft 52 and the crank arm 14. Since the wiper blade and arm assemblies complete an inboard and an outboard stroke during each revolution of the crank 14, the lever 54 oscillates at a rate which is a multiple of the rate of movement of the wiper arm and blade assemblies, in this instance at four times the rate of the wiper arm and blade assemblies.

The washer pump preferably includes a liquid displacing member in the form of a bellows, not shown, disposed within the cylindrical portion 62 of the housing 38. An inlet and outlet check valve assembly 64 is attached to the end of the cylindrical housing part 62, the check valve assembly 64 including an inlet nipple 66 for connection to the conduit 26, and outlet nipples 68 and 70 for connection to the delivery conduits 30 and 32, respectively. The liquid displacing bellows is connected to a reciprocable pump rod, or plunger, 72 having an elongate slot 74 through which the stub shaft 42 extends. The pump rod 72 is used to effect the intake stroke of the liquid displacing bellows by movement thereof to the left, as viewed in FIGURES 2 and 3, while a coil spring 76 encircling a portion of the rod 72 is used to effect the delivery stroke of the liquid displacing bellows.

A channel-shaped armature 78, as seen in FIGURES 2, 3, 6 and 7, is pivotally mounted on an upstanding pin 80 attached to the pump rod 72. The armature 78 has aligned apertures 82 in the side walls thereof through which the pin 80 extends. The side walls of the armature 78 are also formed with aligned, elongate, open sided slots 84 adapted to coact with the cam follower pin 60 to establish the driving connection between the pump rod 72 and the cam 40. A torsion spring 86 normally biases the armature 72 against in integral upstanding stop pin 88 formed on the housing 38, as seen in FIGURES 2 and 6.

An electromagnet comprising a U-shaped frame 90, attached to the housing 38 by upstanding pin 92, a coil 94, and a core 96 is used to move the armature 78 from the position of FIGURE 6 to the position of FIGURE 2 when the coil 94 is energized. The top wall of the channelled armature 78 coacts with the core 96 of the electromagnet, and is attracted thereby when the coil 94 is energized.

When the wiper unit is energized, the multiple lobe cam 40 is continuously rotated, and thus imparts oscillation to the lever 54. As long as the electromagnet including the coil 94 is deenergized, the armature 78 remains in the position of FIGURE 6 whereat the cam follower pin 60 does not engage elongate slot means 84 of the armature 78. In other words, when the electromagnet is deenergized, the armature 78 is maintained by the torsion spring 86 in a position outside the path of movement of the cam follower pin 60. The liquid displacing bellows is thus collapsed, and maintained in the collapsed condition by the coil spring 76.

Upon energization of the coil 94 of the electromagnet, the armature 78 moves from the position of FIGURE 6 to the position of FIGURE 2. In effect, the armature 78 is moved to a position where it becomes latched around the cam follower pin 60 by virtue of the elongate open sided slots 84 in the side walls thereof. With the electromagnet energized, rotation of the cam 40 and oscillation of the lever 54 will result in reciprocation of the pump rod 72 so as to intermittently operate the washer pump, the intake strokes being effected by mechanical movement of the pump rod 72 to the left, as viewed in FIGURE 2, and the delivery strokes being effected by the spring 76 which has energy stored therein during mechanical movement of the pump rod 76 to the left by the lever 54 through the cam follower pin 60. Thus, the washer unit will operate to deliver intermittent squirts of liquid solvent onto predesignated areas of the windshield 22 in timed relation with movement of the wiper blades 20 thereacross. In the particular embodiment disclosed, the washer pump will deliver two squirts of liquid solvent during each inboard stroke and each outboard stroke of the wiper blades.

The washer unit will remain operative as long as the vehicle operator maintains the energizing circuit for the electromagnet closed when the wiper unit is operating. Upon deenergization of the electromagnet, the driving connection between the pump rod 72 and the cam follower pin 60 will be automatically interrupted by pivotal movement and the armature 78 under the influence of spring 86 against the stop 88. Operation of the wiper unit will, of course, also be manually controlled by the vehicle operator.

While the embodiment of the invention as herein disclosed constitutes a preferred form, it is to be understood that other forms might be adopted.

What is claimed is as follows:

1. A washer pump for a vehicle windshield cleaning system including, a housing, a rotatable cam journalled in said housing, a movable cam follower supported in said housing and having continuous engagement with said cam, a reciprocable pump rod disposed in said housing, a pump having a liquid displacing member operatively connected with said rod and having an intake stroke and a delivery stroke, an armature pivotally mounted on said pump rod and having open sided, elongate slot means for engagement with said cam follower, and an electromagnet disposed in said housing which, when energized, attracts said armature so as to engage the open sided, elongate slot means thereof with said cam follower to establish a driving connection between said cam and said pump rod.

2. A washer pump for a windshield cleaning system including, a housing, a motor driven rotatable cam journalled in said housing, a movable cam follower disposed in said housing and having continuous engagement with said cam, a reciprocable pump rod disposed in said housing, a pump having a fluid displacing member operatively connected with said rod and having an intake stroke and a delivery stroke, a channel-shaped armature pivotally mounted on said rod and having aligned, elongate, open sided slot means in the side walls thereof adjacent the end of the armature remote from its pivotal connection with said pump rod, and an electromagnet mounted in said housing which, when energized, attracts said armature so as to engage the elongate, open sided slot means thereof with the oscillatable cam follower and establish a driving connection between the pump rod and said cam.

3. The washer pump set forth in claim 2 including torsion spring means engaging said armature and normally biasing the same to a position where the elongate slot means thereof lies outside the path of movement of said cam follower when the electromagnet is deenergized.

4. The washer pump set forth in claim 2 wherein said cam follower comprises a lever pivotally supported in said housing at one end and having a cam follower pin adjacent its other end, a first portion of said cam follower pin having continuous engagement with said cam, a second portion of said cam follower pin being engageable with the elongate, open sided slot means of said armature, and spring means biasing said lever so as to maintain said first portion of said cam follower pin in engagement with said cam.

5. A washer pump for a vehicle windshield cleaning system including, a housing, a rotatable cam journalled in said housing, a movable cam follower supported in said housing and having continuous engagement with said cam, a reciprocable pump rod disposed in said housing, a pump having a liquid displacing member operatively connected with said rod and having an intake stroke and a delivery stroke, a member pivotally mounted on said pump rod and having an open sided, elongate slot engageable with said cam follower, and means for actuating said member to engage the open sided, elongate slot thereof with said cam follower to establish a driving connection between said cam and said pump rod.

References Cited in the file of this patent

FOREIGN PATENTS

| | | |
|---|---|---|
| 860,087 | Great Britain | Feb. 1, 1961 |
| 1,092,325 | Germany | Nov. 3, 1960 |